US012616996B2

(12) United States Patent
Koerner et al.

(10) Patent No.: US 12,616,996 B2
(45) Date of Patent: May 5, 2026

(54) METHODS FOR COATING SUBSTRATES

(71) Applicant: AXALTA COATING SYSTEMS IP CO., LLC, Wilmington, DE (US)

(72) Inventors: Michael R. Koerner, Media, PA (US); Hao Huang, Pennsylvania, PA (US)

(73) Assignee: AXALTA COATING SYSTEMS IP CO., LLC, Wilmington, DE (US)

( * ) Notice: Subject to any disclaimer, the term of this patent is extended or adjusted under 35 U.S.C. 154(b) by 109 days.

(21) Appl. No.: 18/044,406

(22) PCT Filed: Sep. 14, 2021

(86) PCT No.: PCT/US2021/050230

§ 371 (c)(1),
(2) Date: Mar. 8, 2023

(87) PCT Pub. No.: WO2022/060711

PCT Pub. Date: Mar. 24, 2022

(65) Prior Publication Data

US 2023/0347380 A1 Nov. 2, 2023

Related U.S. Application Data

(60) Provisional application No. 63/078,704, filed on Sep. 15, 2020.

(51) Int. Cl.

| | |
|---|---|
| ***B05D 7/00*** | (2006.01) |
| ***B05D 3/08*** | (2006.01) |
| ***B05D 7/24*** | (2006.01) |

(52) U.S. Cl.

CPC ............... *B05D 7/544* (2013.01); *B05D 3/08* (2013.01); *B05D 7/24* (2013.01); *B05D 2201/00* (2013.01); *B05D 2202/00* (2013.01)

(58) Field of Classification Search

CPC ............................................... B05D 7/51–587
See application file for complete search history.

(56) References Cited

U.S. PATENT DOCUMENTS

| | | | |
|---|---|---|---|
| 4,546,046 | A | 10/1985 | Etzell et al. |
| 5,763,070 | A | 6/1998 | Kerlek et al. |

(Continued)

FOREIGN PATENT DOCUMENTS

| | | | |
|---|---|---|---|
| CN | 1339989 | A | 3/2002 |
| CN | 1596290 | A | 3/2005 |

(Continued)

OTHER PUBLICATIONS

Book: Function materials for environmental treatment; Author: Liao Runhua etc.; Publisher: China Building Materials Industry Press; Date: Apr. 30, 2017.

(Continued)

*Primary Examiner* — Alex A Rolland
(74) *Attorney, Agent, or Firm* — Ingrassia Fisher & Lorenz, LLP

(57) ABSTRACT

Coated substrates, methods of coating substrates, and coatings for substrates are provided. In an exemplary embodiment, a method for coating a substrate includes coating the substrate with a primer to form a primer layer, where the primer comprises a primer conductivity additive, a primer adhesion promotor additive, a primer binder, and primer volatiles. The primer layer is flash dried to reduce the primer volatiles to about 20 weight percent or less. The primer layer is coated with a total color coat layer prior to curing the primer layer, and then the total color coat layer and the primer layer are cured to form a cured substrate coating. The cured substrate coating has a substrate coating percent transmissivity of specified amounts or less at four different wavelength ranges, and the cured primer layer has a primer (Continued)

layer transmissivity less than that of the substrate coating percent transmissivity.

11 Claims, 4 Drawing Sheets

(56) References Cited

U.S. PATENT DOCUMENTS

| | | | | |
|---|---|---|---|---|
| 6,750,286 | B1 * | 6/2004 | Schwarte | C09D 175/06 528/80 |
| 6,887,526 | B1 | 5/2005 | Arlt et al. | |
| 6,942,902 | B2 | 9/2005 | Sapper | |
| 2001/0018467 | A1 | 8/2001 | Dunkle | |
| 2010/0273004 | A1 * | 10/2010 | Yamane | B05D 7/536 428/413 |
| 2011/0059244 | A1 | 3/2011 | December et al. | |
| 2011/0111130 | A1 | 5/2011 | Hickl | |
| 2013/0209690 | A1 | 8/2013 | Bautista Mester et al. | |
| 2018/0104718 | A1 * | 4/2018 | Nakayabu | C08G 18/807 |

FOREIGN PATENT DOCUMENTS

| | | |
|---|---|---|
| CN | 104245830 A | 12/2014 |
| CN | 108373767 A | 8/2018 |

OTHER PUBLICATIONS

Book: Furniture Coatings and Finishes; Author: Zhou Zhongfeng etc.; Publisher: China light industry press; Date: Jul. 31, 2020.
ABook:Metallic Functional Materials; Author: Wang Xinlin; Publisher: Metallurgy Industry Press; Date: Apr. 30, 2019.
ISR, International Search Report issued in App No. PCT/US2021/050230, dated Sep. 14, 2021.

* cited by examiner

METHODS FOR COATING SUBSTRATES

PRIORITY CLAIM

This application is a U.S. National-Stage entry under 35 U.S.C. § 371 based on International Application No. PCT/US21/50230, filed Sep. 14, 2021, which was published under PCT Article 21(2), and which claims priority to U.S. Provisional Patent Application Ser. No. 63/078,704 filed on Sep. 15, 2020, which is incorporated herein by reference.

TECHNICAL FIELD

The present disclosure generally relates to methods and coatings for substrates, and more particularly relates to methods and coatings for providing a single system including a primer and color coats that may be utilized over both plastic and metallic substrates.

BACKGROUND

Automobiles and other articles frequently include a variety of different surfaces that require coating. For example, many modern automobile bumpers are primarily plastic, where the body is primarily metallic. However, the same color is desired on both the plastic bumper and the metallic body. Primers for use on plastic materials often include an adhesion promotor additive, because primers without the adhesion promotor additive tend to adhere poorly to the plastic substrate and peel. Metallic substrates often include an electro-deposition coating or "e-coat," which is an electronically applied coating used for corrosion protection and other purposes. Chemical bonds in the e-coat are susceptible to degraded by ultraviolet and visible light radiation, so overlying coatings should block incoming radiation with wavelengths of about 300 to 500 nanometers. The substrate may be grounded and the applied coatings charged to improve transfer efficiency and produce a more even coating, but plastic components are generally poor electrical conductors. A conductive primer can provide the grounding benefit to plastic components for subsequent layer applications, but this adds another requirement for the primer. The different requirements for different portions of automobiles or other mixed substrates often result in different coating systems for the various coating layers.

Production lines for automobiles or other substrates are often designed for specific coating operations. Manufacturers also desire coating operation that utilize short cycle times to control costs. A single coating system that can be used for different portions of a substrate would eliminate the need for separate coating lines for different materials. Therefore, for cost savings, efficiency, and productivity, a single coating line that can be used for different types of substrates is desired. A single coating line that utilizes short cycle times would further speed productivity and efficiency. A single coating process that can be used for substrates with different types of components would also reduce manufacturing space, manpower, inventory, and other resources, because fewer coating process lines would need to be supported. Thinner coats also reduce the cost for the coating material, because less material is used.

Historically, a primer layer has included components that provide the e-coat with all the desired protection from electromagnetic radiation, as well as high levels of opacity so the underlying components would be hidden. Darker colors in the overlying color coats tend to provide higher levels of protection from electromagnetic radiation, as well as providing higher levels of opacity for hiding the underlying components. However, a coating system should be able to support the use lighter colors as well as darker colors. Some coating systems do not include a primer, but this requires higher levels of pigmentation in the color coats to provide the desired hiding, and the use of a single coat to provide the desired opacity tends to result in poor flake orientation that is less aesthetically pleasing. Thinner primer coats facilitate wet on wet coating, because thinner primer layers dry faster and run less than thicker primer layers. Water or other solvents in the color coat tend to penetrate into the underlying primer layer, which exacerbates the problem of running when wet on wet coating practices are used.

Accordingly, it is desirable to develop coatings for a substrate and methods for coating a substrate that include a plastic portion and a metallic portion, where the different portions may be simultaneously coated. In addition, it is desirable to provide a coating system that balances the desires of (1) a rapid application system using thin primer layers for wet on wet application, (2) good adhesion to a variety of different substrates, (3) conductivity of the coating system, and (4) protection from electromagnetic radiation. Furthermore, other desirable features and characteristics of the present embodiment will become apparent from the subsequent detailed description and the appended claims, taken in conjunction with the accompanying drawing and this background.

BRIEF SUMMARY

Coated substrates, methods of coating substrates, and coatings for substrates are provided. In an exemplary embodiment, a method for coating a substrate includes coating the substrate with a primer to form a primer layer, where the primer comprises a primer conductivity additive, a primer adhesion promotor additive, a primer binder, and primer volatiles. The primer layer is flash dried to reduce the primer volatiles to about 20 weight percent or less, where the primer layer is still uncured. The primer layer is coated with a total color coat layer prior to curing the primer layer, and then the total color coat layer and the primer layer are cured to form a cured substrate coating. The cured substrate coating has a substrate coating percent transmissivity of: (1) about 0.02 or less at wavelengths of from 280 nanometers (nm) to 400 nm; (2) about 0.10 or less at wavelengths of from 400 nm to 430 nm; (3) about 0.25 or less at wavelengths of 430 nm to 470 nm; and (4) about 0.5 or less at wavelengths of 470 nm to 500 nm, and wherein the primer layer, when cured, has a primer layer percent transmissivity of: (1) about 0.025 to about 0.05 at wavelengths of from 280 nm to 400 nm; (2) about 0.15 to about 0.5 at wavelengths of from 400 nm to 430 nm; (3) about 0.30 to about 1.0 at wavelengths of 430 nm to 470 nm; and (4) about 0.6 to about 2.0 at wavelengths of 470 nm to 500 nm.

A substrate is provided in another embodiment. The substrate includes a substrate coating with a substrate coating transmissivity of: (1) about 0.2% or less at wavelengths of 280 nanometers (nm) to 400 nm; (2) about 0.1% or less at wavelengths of 400 nm to 430 nm; (3) about 0.25% or less at wavelengths of 430 nm to 470 nm; and (4) about 0.5% or less at wavelengths of 470 nm to 500 nm. The substrate coating includes a primer layer with a primer layer percent transmissivity of: (1) about 0.025 to about 0.05 at wavelengths of from 280 nm to 400 nm; (2) about 0.15 to about 0.5 at wavelengths of from 400 nm to 430 nm; (3) about 0.30 to about 1.0 at wavelengths of 430 nm to 470 nm; and (4)

about 0.6 to about 2.0 at wavelengths of 470 nm to 500 nm. The substrate coating also includes a total color coat layer overlying the primer layer.

A primer is provided in yet another embodiment. The primer includes a primer conductivity additive that provides the primer with a surface conductivity of about $10^5$ ohms at a distance of 4.45 millimeters from a central electrode to a plurality of perimeter probes around the central probe, as tested by a PRS-801 instrument with a PRF-914B probe, as provided by Prostat® Corporation. The primer includes a primer pigment at a concentration of about 20 to about 60 weight percent, and a primer binder. A primer pigment to primer binder ratio is about 8 or more. The primer also includes a primer adhesion promotor. The primer has a primer percent transmissivity of: (1) about 0.025 to about 0.05 at wavelengths of from 280 nm to 400 nm; (2) about 0.15 to about 0.5 at wavelengths of from 400 nm to 430 nm; (3) about 0.30 to about 1.0 at wavelengths of 430 nm to 470 nm; and (4) about 0.6 to about 2.0 at wavelengths of 470 nm to 500 nm at a cured primer thickness of from about 3 to about 8 microns.

BRIEF DESCRIPTION OF THE DRAWINGS

The present embodiments will hereinafter be described in conjunction with the following drawing figures, wherein like numerals denote like elements, and wherein.

DETAILED DESCRIPTION

The following detailed description is merely exemplary in nature and is not intended to limit the application or uses of the embodiments described. Furthermore, there is no intention to be bound by any theory presented in the preceding technical field, background, brief summary, or the following detailed description.

In an exemplary embodiment, a substrate includes a plastic portion and a metallic portion. The metallic portion of the substrate includes an e-coat that should be protected from electromagnetic radiation at selected wavelengths. Accordingly, a coating is applied overlying the e-coat of the metallic portion to provide a reduction of the transmissivity to the specified level in the desired wavelength ranges. In this regard, both the metallic portion and the plastic portion of the substrate are coated with a primer, where the primer is then flash dried to produce a primer layer. The primer layer is thin such that the amount of material in the primer layer that blocks the electromagnetic radiation in the desired wavelengths is limited. As such, the primer provides a portion of the electromagnetic radiation protection desired, but not all of the desired protection. A total color coat layer is then applied over the primer layer, where the total color coat layer also provides some of the electromagnetic radiation protection desired, but not all of the desired protection. The primer layer and the total color coat layer are then cured in a single curing step, and the combination of the cured primer layer and total color coat layer provides all the desired electromagnetic radiation protection. This description explains a balance between 3 different aspects of the coating, which are: (1) The combination of the cured primer layer and the total color coat layer provides sufficient film opacity to achieve the light transmission specification for the underlying e-coat; (2) The primer layer has a thin film build and has sufficient dehydration from a flash drying step, without a curing step, to accept overlying colorcoat layers without running, sagging, or unacceptable volatile transfer from the overlying colorcoat layer to the primer layer; and (3) the primer layer has sufficient conductivity for grounding to provide high transfer efficiency for uniform overlying colorcoat layer over both metal and plastic substrates.

Figure 1:
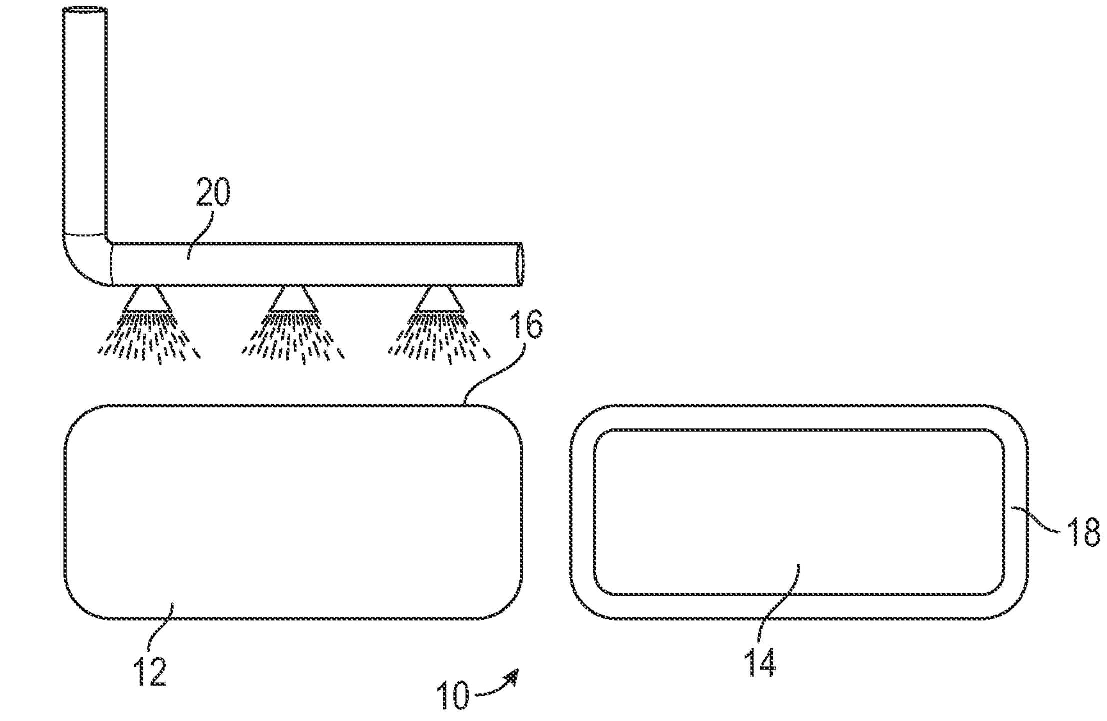
FIGS. 1-6 illustrates steps in an exemplary method of coating a substrate and the substrate during the coating process.

Reference is made to an exemplary embodiment in FIG. 1. A substrate 10 includes a first portion 12 that is primarily plastic, and a second portion 14 that is primarily metallic. As used herein, a component that is "primarily" a named material is at least 50 percent by weight of that material, so the first portion 12 being primarily plastic means at least 50 percent by the weight of the first portion 12 is plastic, based on a total weight of the first portion 12. In some embodiments, a component that is primarily a named material is at least 80 weight percent of the named material, or at least 90 weight percent of the named material, and may be 100 weight percent of the named material. The substrate 10 includes a surface 16 that will be coated.

The first portion 12 is primarily plastic, and in this description "plastic" means the substrate includes polymers, which may include polycarbonate, polypropylene, polyamides, polyesters, polyurethanes, thermoplastic olefins, other plastic materials, or combinations thereof. Furthermore, a "plastic" material may include reinforcing fibers, such as fiberglass, aramid fibers, carbon fibers, etc. The second portion 14 is primarily metallic, such as aluminum, steel, or other metals, and an e-coat layer 18 is present on the surface 16 of the second portion 14. The e-coat layer 18 is an anti-corrosion coating, and is applied by holding the second portion 14 (or the entire substrate 10) within a bath of the e-coat coating material. The bath includes resins that are deposited on the surface of the second portion 14, where the resins may include epoxy resins, acrylic resins, or other types of resins. The bath may include other materials, such as crosslinking agents, pigments, plasticizers, flow modifiers, catalysts, etc. A current is passed through the second portion 14 and causes resins and other materials of the e-coat coating material to deposit onto the surface 16 of the second portion 14. In this description, the e-coat layer 18 is considered a part of the substrate 10.

Chemical bonds in the e-coat layer 18 are sensitive to some electromagnetic radiation wavelengths, so coatings that cover the e-coat layer 18 are often given a specification for maximum transmissivity of electromagnetic radiation. Specifically, aromatic epoxy esters which may be present in the e-coat layer 18 are susceptible to damage from electromagnetic radiation with wavelengths of about 300 to 500 nanometers. In an exemplary embodiment, coatings covering the e-coat layer 18 should provide a percent transmission of: (1) 0.2% or less at wavelengths of 280 nanometers (nm) to 400 nm; (2) 0.1% or less at wavelengths of 400 nm to 430 nm; (3) 0.25% or less at wavelengths of 430 nm to 470 nm; and (4) 0.5% or less at wavelengths of 470 nm to 500 nm. The term "percent transmissivity," as used herein, refers to the amount of electromagnetic radiation in the names wavelength range that passes through the material divided by the amount of electromagnetic radiation in the named wavelength range that impacts the material, times 100 for the percent value. The percent transmissivity varies with the wavelength of the electromagnetic radiation, so different values are specified for different wavelength ranges. Lower levels or transmissivity means less of the electromagnetic radiation passes through the coating, so lower levels of transmissivity provide greater protection for underlying components. Coating transmissivity depends on at least 3 factors, including (a) the thickness of the coating layer, (b) the absorption coefficient of the materials in the coating, and (c) the concentration of the materials in the coating that absorb the electromagnetic radiation. Therefore, when thin layers are used, the thickness of the coating layer limits the reduction of the percent transmissivity.

The plastic composition of the first portion 12 may interfere with wetting and adhesion of coatings, so a flame treatment of the first portion 12 (or of the entire substrate 10 in some embodiments) may optionally be utilized. The flame treatment is obtained by exposing the surface 16 of the first portion 12 to a flame from a flame treatment device 20 to ionize material at the surface 16 of the first portion 12. The flame treatment device 20 may optionally include other components, including but not limited to an ion bar and air knife (not illustrated), which may aid in ancillary tasks such as cleaning dust from the first portion 12. The first portion 12 may be exposed to the flame treatment before the first and second portions 12, 14 are merged together in some embodiments, where FIG. 1 illustrates the substrate 10 separated. For example, a polypropylene surface may be exposed to an inner cone of a flame, which may be at a temperature of about 1,800 degrees Celsius (° C.) for a time period of less than a second, so the plastic substrate does not have time to melt. The ionized material aids in wetting of many coating materials, and this may improve the life span of coatings.

Figure 2:
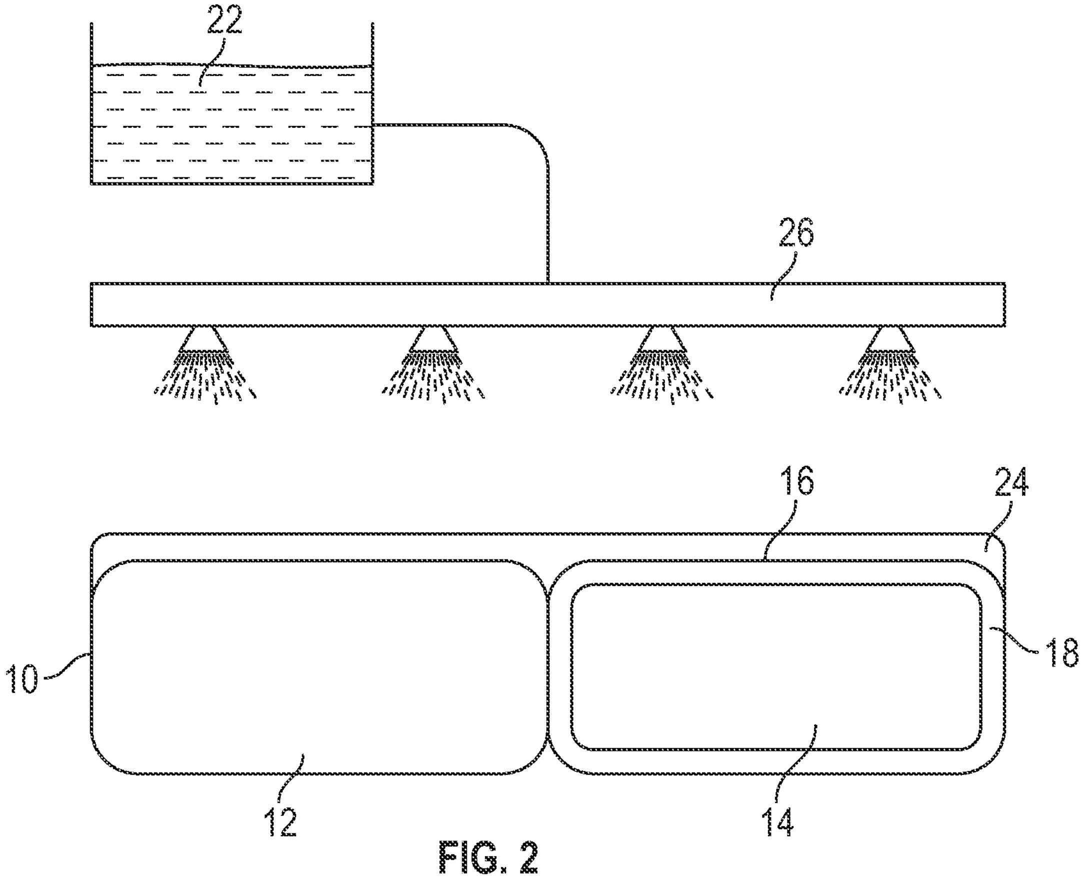

Referring to FIG. 2, a primer 22 is applied to the surface 16 of the substrate 10 to form a primer layer 24 overlying the substrate 10. As used herein, the term "overlying" means "over" such that an intervening layer may lie between an overlying layer (the primer layer 24 in this example) and the underlying layer or component (the substrate 10 in this example), or "on" such that the overlying layer physically contacts the underlying layer or component. Moreover, the term "overlying" means a vertical line passing through the overlying layer also passes through the underlying layer or component, such that at least a portion of the overlying layer is directly over at least a portion of the underlying layer or component. A "vertical" line is a line that is perpendicular to the substrate surface 16. It is understood that the substrate 10 may be moved such that the relative "up" and "down" positions change, so a line that is perpendicular to the substrate surface 16 refers to the substrate orientation as depicted in the drawings.

Figure 7:
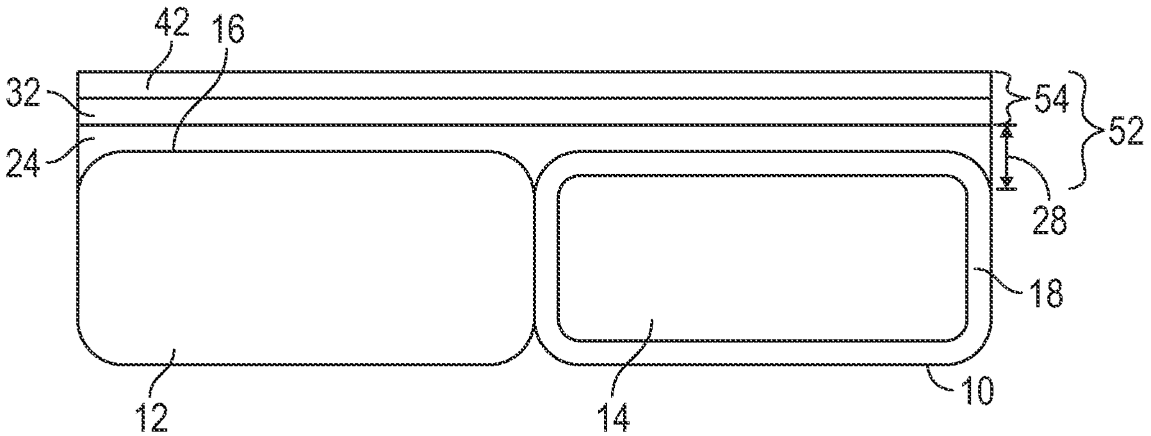
FIG. 7 is a cross-sectional view of an embodiment of a coated substrate.
Figure 8:
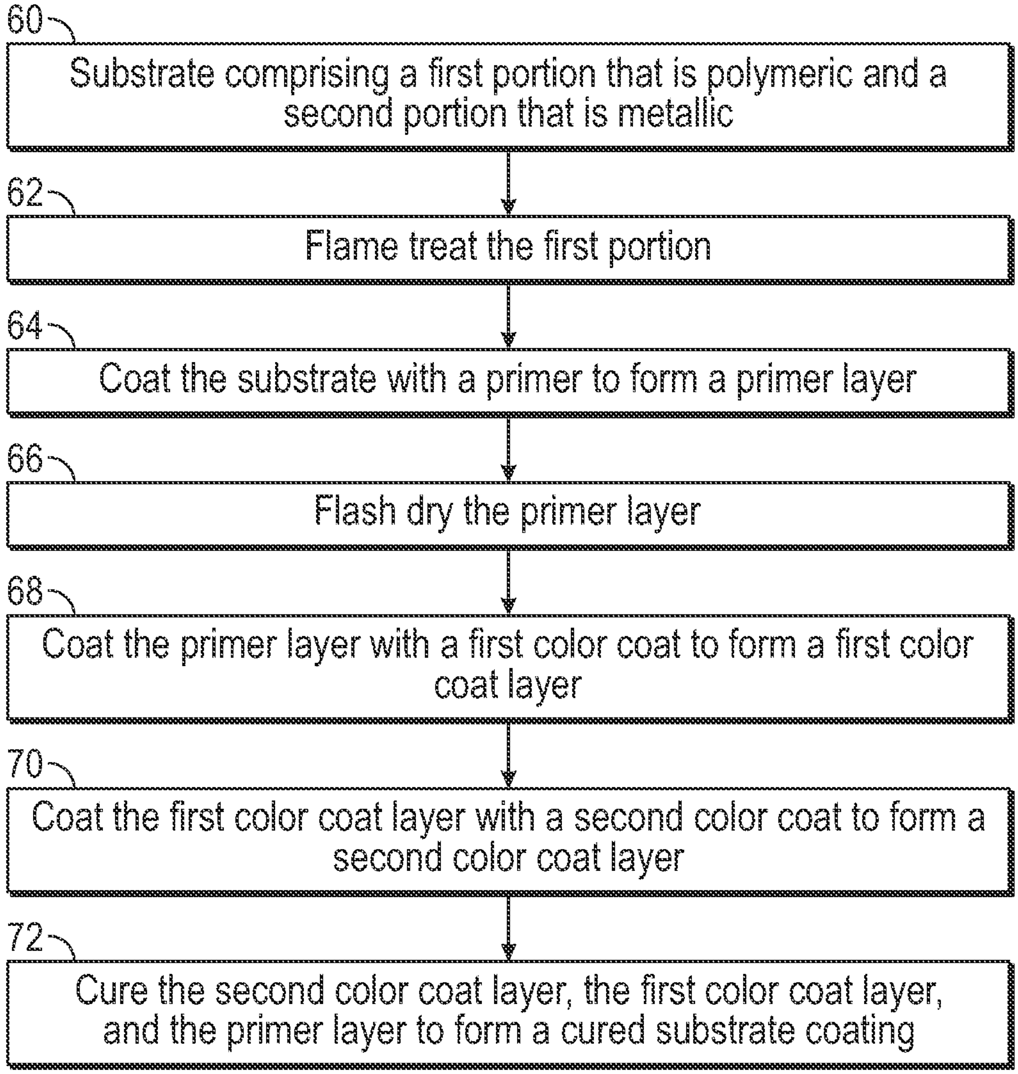
FIG. 8 is a flow chart showing a method of coating a substrate in an exemplary embodiment.

The primer 22 is applied with a primer application device 26, such as a spray nozzle, a spray gun, a rotary bell atomizer, doctor blading, or other techniques. The second portion 14 may optionally be grounded or electrically charged to facilitate improved transfer efficiency of the coatings to provide an even coating with the primer 22 (not illustrated) in some embodiments. In general, the first portion 12 is not electrically conductive, so grounding or electrically charging the first portion 12 before priming is not practicable. However, the primer 22 provides an electrically conductive surface so the first portion 12 may be grounded for subsequent coatings, as described below. The primer 22 is applied in a thin primer layer 24, such that a primer layer thickness 28 is from about 3 to about 8 microns after curing, in an exemplary embodiment. (NOTE: The cured primer layer thickness 28 is illustrated in FIG. 7, because the primer layer 24 is not cured in FIG. 2) However, in alternate embodiments, the primer layer thickness 28, after the primer layer 24 is cured, may be from about 4 to about 6 microns, or about 5 microns. The amount of primer volatiles influences the thickness of the primer layer 24 before curing and before evaporation of the primer volatiles. The term "solids," as used herein, means residual material after drying for 60 minutes at 100° C. following the method of ASTM D2369. The term "volatiles," as used herein, means material that evaporates or volatilizes following the method of ASTM D2369, so the coating is divided into solids and volatiles. The transmissivity of the primer layer 24, or the primer layer transmissivity, is dependent on the primer layer thickness 28, where thicker layers provide lower percent transmissivity values than thinner layers.

The primer 22 includes several components, including but not limited to a primer binder, a primer pigment, a primer conductivity additive, a primer adhesion promotor additive, and a primer solvent. In some embodiments, the primer conductivity additive may also be a primer pigment in that the primer conductivity additive may provide color to the primer 22. The primer 22 may also include other components, such as surfactants, rheology agents, leveling agents, thickeners, etc. The term "binder," as used herein, refers to film forming constituents of a coating composition that typically comprise one or more polymers, such as one or more acrylic polymers, one or more polyester polymers, one or more polyether polymers, one or more additional type of polymers, one or more oligomers, one or more monomers, or a combination thereof. A binder can comprise a crosslinkable component and a crosslinking component that can react with the crosslinking component to form crosslinked polymers. The binder may also include crosslinkable components that crosslink with themselves. The binder in this disclosure can further comprise other polymers, compounds or molecules that are useful for forming crosslinked coatings having desired properties, such as good adhesion, high distinctness of image, etc. Typical crosslinkable functional groups can include hydroxyl, thiol, isocyanate, thioisocyanate, acetoacetoxy, carboxyl, primary amine, secondary amine, epoxy, anhydride, ketimine, aldimine, or a workable combination thereof. Some other functional groups such as orthoester, orthocarbonate, or cyclic amide that can generate hydroxyl or amine groups once the ring structure is opened can also be suitable as crosslinkable functional groups. The type of primer binder is not essential, and a variety of different primer binders may be utilized in alternate embodiments. This description of binders also applies to other coating binders in this disclosure.

The primer pigment provides color to the primer layer 24, and a wide variety of primer piments may be utilized. The primer pigment may be present in the primer 22 in an amount of from about 20 to about 60 weight percent, based on a total weight of the primer 22. The primer pigments may provide a reduction of transmissivity of the primer 22, and this primer reduction of transmissivity from the primer pigment is included in the description of transmissivity above and below. A primer pigment to primer binder ratio may be about 8 or greater in some embodiments, where the primer pigment to primer binder ratio is based on a total weight of the primer pigment and the total weight of the primer binder in the primer 22. Lower primer pigment to primer binder ratios provide for stronger primer layers 24 at the expense of coloration and primer percent transmissivity, and vice versa. Some other components of the primer 22 may also help lower the primer percent transmissivity. The primer percent transmissivity, when the primer 22 is cured at a primer layer thickness 28 of from about 3 to about 8 microns, is: (1) about 0.025 to about 0.05 at wavelengths of from 280 nm to 400 nm; (2) about 0.15 to about 0.5 at wavelengths of from 400 nm to 430 nm; (3) about 0.30 to about 1.0 at wavelengths of 430 nm to 470 nm; and (4) about 0.6 to about 2.0 at wavelengths of 470 nm to 500 nm.

The primer conductivity additive is used to make the primer layer 24 electrically conductive. The term "electrically conductive," as used herein, means a surface conductivity of about $10^5$ ohms at a distance of 4.45 millimeters from a central electrode to a plurality of perimeter probes around the central probe, as tested by a PRS-801 instrument with a PRF-914B probe, as provided by Prostat® Corporationor greater. The surface conductivity of the primer layer 24 is referred to as the primer layer conductivity, and in an exemplary embodiment the primer layer conductivity is about $10^5$ ohms at a distance of 4.45 millimeters from a central electrode to a plurality of perimeter probes around the central probe or greater. The primer conductivity additive is carbon black in an exemplary embodiment, but other components that impart conductivity to a coating layer may be used in alternate embodiments, including but not limited to titanium dioxide, carbon nanotubes, other additives containing metals, and combinations thereof. The primer conductivity additive may impart some color to the primer layer 24, so the primer conductivity additive may also serve as a primer pigment. The primer conductivity additive may contribute to the percent transmissivity of the electromagnetic radiation at the specified wavelengths. Any contribution to the percent transmissivity of electromagnetic radiation at the specified wavelengths is considered and included in the primer percent transmissivity discussed above. Electrical conductivity of the primer layer 24 facilitates electro-deposition of subsequent coating layers, where the substrate 10 and primer layer 24 are grounded and the coating is charged during deposition to aid in uniformity and efficiency of the subsequent coating operations. In alternate embodiments, the substrate 10 and primer layer 24 may be charged instead of grounded during electro-deposition.

The primer adhesion promoter facilitates good wetting and a strong bond between the primer layer 24 and the first portion 12 of the substrate, which is primarily plastic, as mentioned above. A wide variety of primer adhesion promotors may be utilized in various embodiment. In an exemplary embodiment, the primer adhesion promotor and the primer 22 are free of chlorinated polyolefins (CPOs), but CPOs may be utilized in alternate embodiments. As used herein, "free" of a component means a concentration of about 0.001 weight percent or less, based on a total weight of the reference material. Potential primer adhesion promotors include, but are not limited to, one or more of organo-functional silanes, organometallic compounds, phosphates, silicones, etc. The primer layer 24 adheres to the second portion 14 of the substrate 10, but the primer layer 24 also adheres to the first portion 12 of the substrate 10, so a primer 22 has good adhesion to both types of materials.

The primer solvent may be water in an exemplary embodiment, but organic solvents may be utilized in alternate embodiments. Most of the primer solvent evaporates or otherwise dissipates before the primer layer 24 is fully cured, so the primer solvent should be relatively volatile and the primer solvent forms all or a portion of the primer volatiles. The primer layer 24 is thin, so organic solvents may be desirable for use with binders and other components that produce a good primer layer 24 with a thin primer layer thickness 28.

Figure 3:
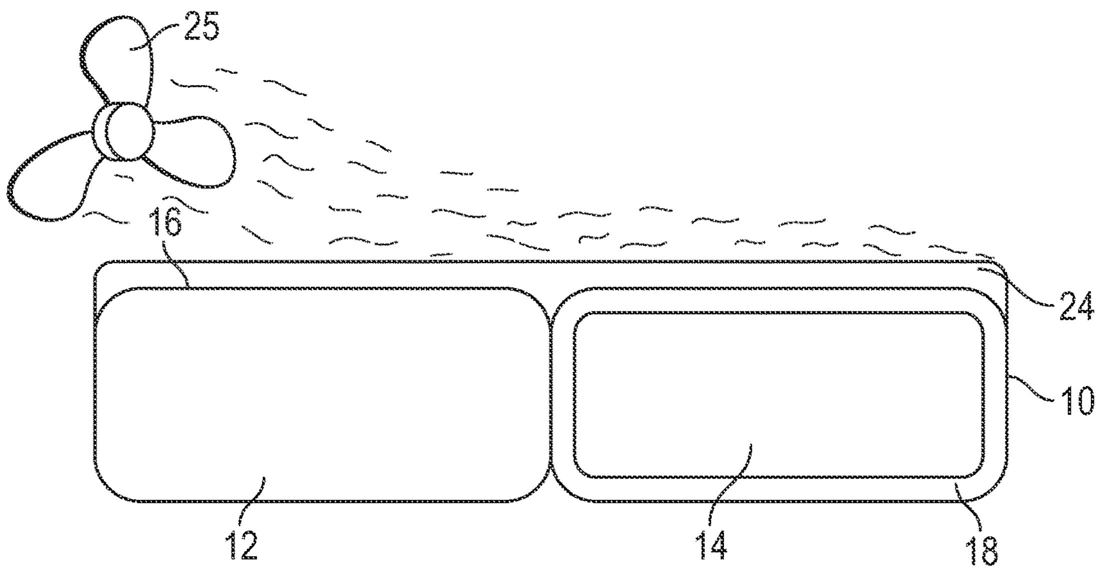

Once the primer layer 24 is formed, it is flash dried to reduce the amount of primer volatiles present in the primer layer 24, as illustrated in FIG. 3. Flash drying reduces the concentration of the primer volatiles (such as the solvent) in the primer layer 24 to an amount of about 20 weight percent or less in an exemplary embodiment, but the primer volatiles may be reduced to about 15 weight percent or 10 weight percent in alternate embodiments, all based on a total weight of the primer layer 24. The primer layer 24 should be thin enough that overlying layers do not cause running or sagging when applied over the primer layer 24 before curing (i.e., wet on wet application.) Overlying coatings will typically include solvents or other volatiles that will penetrate into the primer layer 24, so the flash drying reduces the volatile loading of the primer layer 24 such that there is no running or sagging with wet-on-wet applications, even with volatiles from the overlying layer penetrating into the primer layer 24.

The primer layer 24 may be flashed dried by exposure to an elevated temperature, such as a temperature of about 40 to about 80° C., for a time period of from about 1 to about 10 minutes. However, in alternate embodiments the primer layer 24 may be flash dried by exposure to a temperature of about 60 to about 80° C., or about 70 to about 80° C., for a time period of from about 1 to about 3 minutes. In an alternate embodiment, flash time may be further reduced by forcing preheated air across the exposed surface of the primer layer 24. For example, an air knife 25 can reduce flash time by about 50%. Flash properties of the primer layer 24 may be customized and optimized by considering a combination of flash time, air temperature for the flash, air humidity for the flash, and the air velocity across the surface of the primer layer 24.

The primer layer 24 is not cured during the flash drying. As used in this description, "curing" of a coating layer means crosslinking the binder such that a gelled or elastic structure is built in the film. This physical state is achieved when more than about 50 percent of the crosslink sites that will react at equilibrium are reacted and crosslinked. As such, a coating layer is not cured if about 50 percent or less of the crosslink sites that will react at equilibrium have reacted and crosslinked. Binders typically include multiple sites that may crosslink, but not all sites may be available for crosslinking at equilibrium because of stearic factors. For example, as a polymer crosslinks, mobility of the polymer chain is limited and some sites that have functional groups that could theoretically react to form a crosslink will be held in a position where no crosslinking sites are available for reaction. As such, some of the total amount of crosslink sites will never crosslink, even at equilibrium, because of steric factors. The definition as used herein for "cured" depends on the sites that may react at equilibrium so functional groups (sites) that are prevented from crosslinking due to stearic reasons are not considered.

Figure 4:
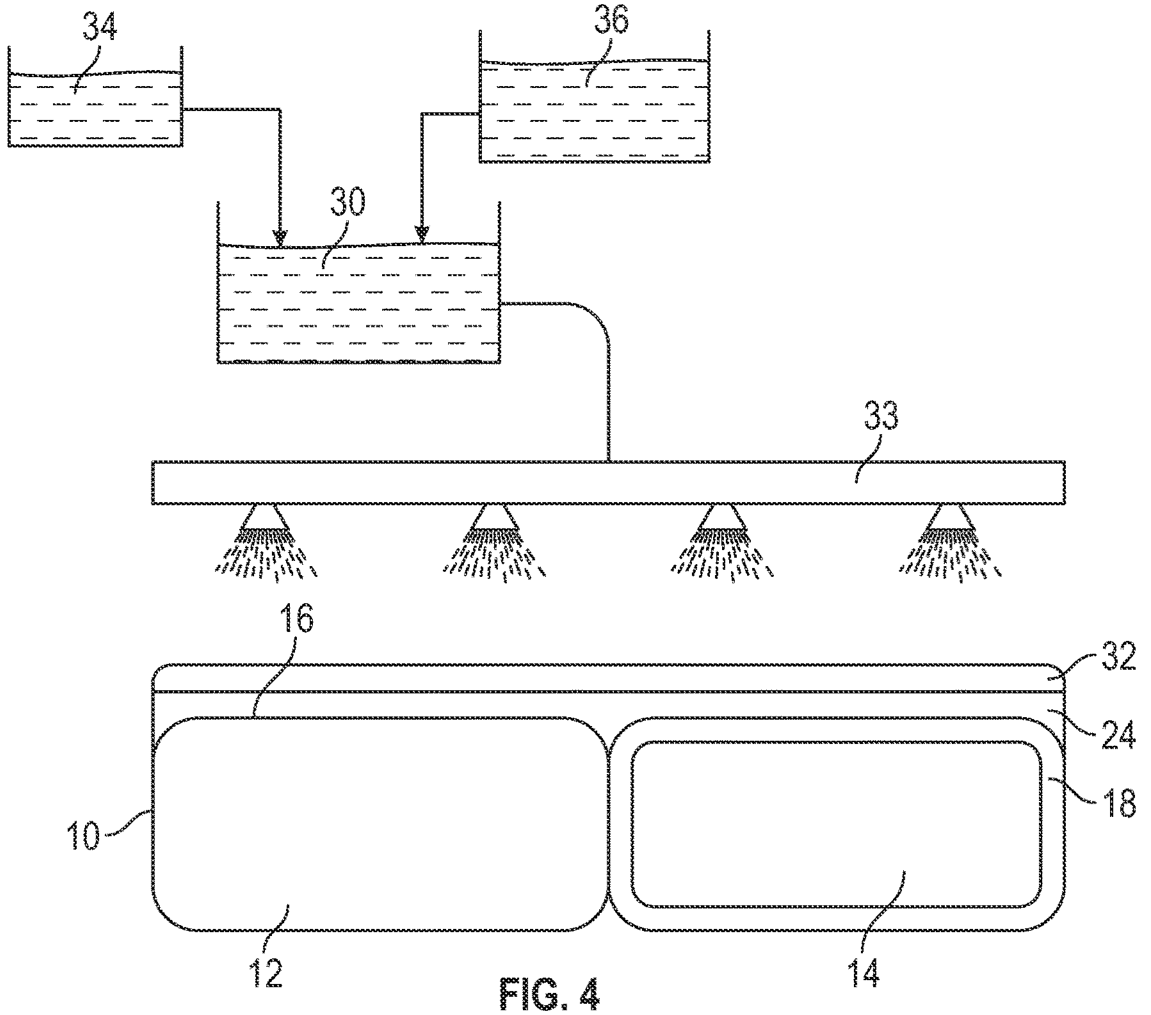

A first color coat 30 is formed and applied overlying the primer layer 24 to form a first color coat layer 32, as illustrated in FIG. 4. A first application device 33 may be used to apply the first color coat layer 32, where the description of the primer application device 26, above, applies to the first color coat application device 33 as well. The substrate 10 may be grounded or electrically charged during application of the first color coat layer 32 to improve transfer efficiency and the thickness consistency. The primer conductivity additive in the primer 22 facilitates charge transfer (i.e., grounding in an exemplary embodiment) from the substrate 10 through the primer layer 24, which improves transfer efficiency of the coating process for the first color coat layer 32. In this context, transfer efficiency means the fraction of first color coat 30 that remains on the target (the primer layer 24 in this example) and does not bypass the target (e.g. become lost to overspray).

The first color coat 30 includes a first color main body 36 and an optional first activation additive 34, which are combined to form the first color coat 30 before application overlying the primer layer 24. The first color coat 30 includes a first binder, a first pigment, a first solvent, and the optional first activation additive 34, and may also include other optional ingredients such as thickeners, surfactants, rheology agents, etc. The first binder may be a wide variety of binders, as described above, where the first binder is a material that will crosslink when combined with the first activation additive 34. In an exemplary embodiment, the first activation additive 34 includes an isocyanate, and the first binder includes one or more of a hydroxyl group, a carboxyl group, and an amino group, but other combinations of first binders and first activation additives 34 are also possible. The first activation additive 34 speeds crosslinking of the first color coat layer 32. The first pigment may be the desired color of the article, and the first pigment may provide some desired reduction of percent transmissivity of electromagnetic radiation at the specified wavelengths. The first solvent may include water, and the first solvent may primarily include water so water forms at least 50 percent of the first solvent.

The first color coat layer 32 overlies the primer layer 24, and is applied before the primer layer 24 has cured. The primer layer 24 is thin, as described above, and application of the first color coat layer 32 overlying the primer layer 24 before the primer layer 24 cures limits the primer layer thickness 28. If the primer layer 24 were too thick, it would run before curing when the first color coat layer 32 was applied. Some of the first solvent will migrate into the primer layer 24, so flash drying of the primer layer 24 to remove primer volatiles aids in preventing sagging. In an exemplary embodiment, the first color coat layer 32 is from about 4 to about 20 microns thick when cured, but other thicknesses are also possible. For example, the first color coat layer 32 may have a cured thickness of from about 6 to about 15 microns, or from about 10 to about 15 microns.

Figure 5:
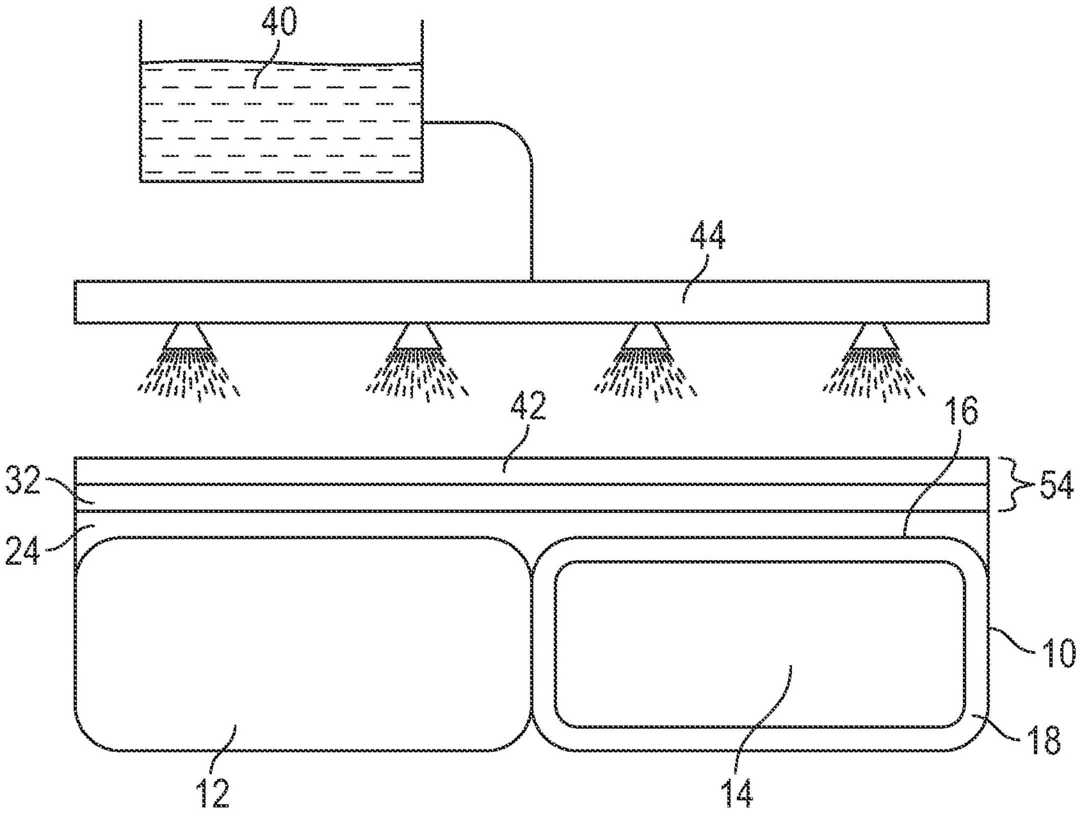

Referring to FIG. 5 with continuing reference to FIG. 4, the second color coat 40 is then applied overlying the first color coat layer 32 to form the second color coat layer 42. The second color coat 40 is applied with a second application device 44, where the description of the primer application device 26, described above, is also applicable to the second application device 44. The substrate 10 may be grounded or charged during application of the second color coat 40, as described for the first color coat layer 32 above. The primer conductivity additive aids in the transfer of charge from the substrate 10 through the conductive primer layer 24, which aids in a charged coating process for the second color coat 40 as well as for the first color coat 30.

The second color coat 40 includes a second binder, a second pigment, and a second solvent, and may also include other optional ingredients such as surfactants, rheology agents, etc. The second color coat 40 is applied before the first color coat layer 32 or the primer layer 24 have cured. The second color coat 40 may also be applied before the first color coat layer 32 has been flash dried in some embodiments. This decreases the cycle time, because no lengthy cure is needed before application of the second color coat layer 42. The first activation additive 34 speeds the cure rate of the first color coat layer 32, as mentioned above, and this allows for a thicker first color coat layer 32 and/or second color coat layer 42. The first activation additive 34 also migrates from the first color coat layer 32 into the primer layer 24 and the second color coat layer 42 to some extent, because the primer layer 24, the first color coat layer 32, and the second color coat layer 42 are not cured at the time of application of the second color coat layer 42. Therefore, the first activation additive 34 initiates crosslinking in the first color coat layer 32, as mentioned above, but also initiates some crosslinking in the primer layer 24 and the second color coat layer 42, as well as crosslinking between the binders in the primer, first color coat, and second color layers 24, 32, 42. The crosslinking between the different layers may improve the strength and resiliency of the overall coating. In an exemplary embodiment, the second color coat layer 42 may have a cured thickness of from about 4 to about 20 microns, but in alternate embodiments the thickness of the cured second color coat layer 42 may be from about 6 to about 15 microns, or from about 10 to about 15 microns.

In an exemplary embodiment, the only difference between the first and second color coats 30, 40 is the optional presence of the first activation additive 34. As such, the second color coat 40 may be free of an isocyanate. The first binder and the second binder may be the same material, the first pigment and the second pigment may be the same material, and the first solvent and the second solvent may be the same material. The first and second solvent may primarily include water in an exemplary embodiment, where the first and second solvent include 50 weight percent or more water, based on a total weight of the first solvent and the second solvent, respectively. However, in alternate embodiments, the first and second color coats 30, 40 may be different, so the first and second solvents are different from each other, and/or the first and second binders may be different from each other, and/or the first and second pigments may be different from each other.

Figure 6:
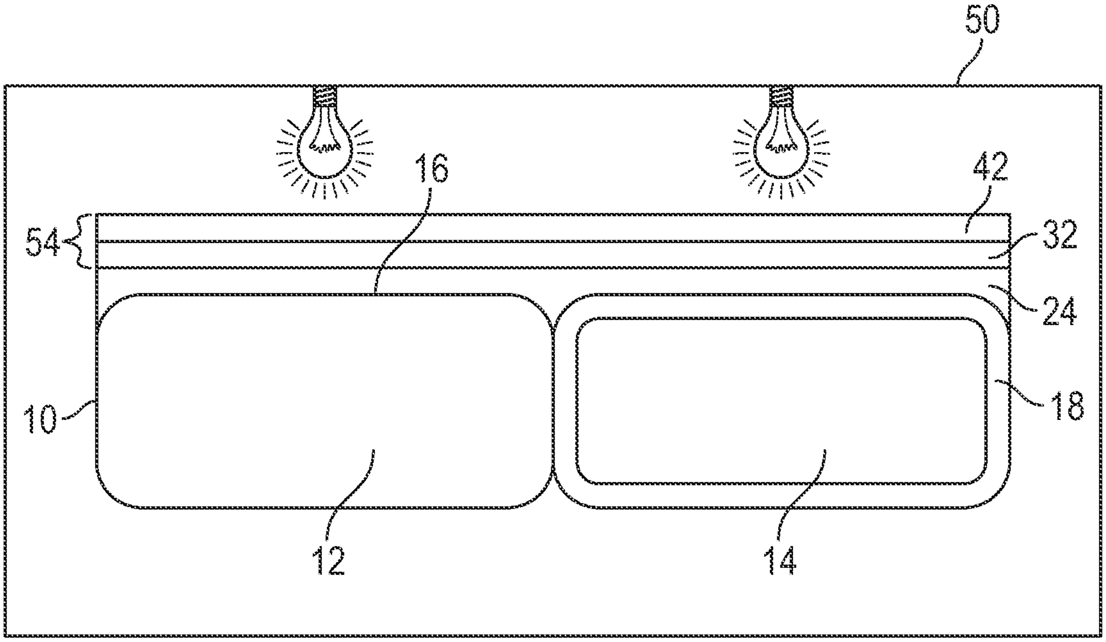

After the second color coat layer 42 is formed, the second color coat layer 42, the first color coat layer 32, and the primer layer 24 are cured in an exemplary embodiment illustrated in FIG. 6. These three layers 42, 32, 24 may be simultaneously cured in a curing oven 50 at a temperature of about 60 to about 160° C. for about 5 minutes to about 2 hours. However, in alternate embodiments the second color coat layer 42, the first color coat layer 32, and the primer layer 24 may be cured at a temperature of about 65 to about 140° C., or at a temperature of about 65 to about 100° C., for a time period of from about 5 minutes to about 2 hours, or from about 5 minutes to about 1 hour, of from about 10 minutes to about 30 minutes.

Reference is made to FIG. 7, with continuing reference to FIGS. 1-6. The first and second color coat layers 32, 42, when cured, form a total color coat layer 54 having a total color coat percent transmissivity of: (1) about 0.025 to about 0.05 at wavelengths of from 280 nm to 400 nm; (2) about 0.15 to about 0.5 at wavelengths of from 400 nm to 430 nm; (3) about 0.30 to about 1.0 at wavelengths of 430 nm to 470 nm; and (4) about 0.6 to about 2.0 at wavelengths of 470 nm to 500 nm. This total color coat percent transmissivity provides less than the total desired level of protection of for the underlying e-coat layer 18. The total color coat percent transmissivity depends on the thickness of the total color coat layer 54, which thickness is limited by the rapid application without a flash drying or curing step between the first and second color coat layers 32, 42. A total cured color coat thickness is the thickness of the cured color coats (i.e., the thickness of the first and second color coat layer 32, 42 after they have cured), and is from about 4 to about 25 microns in an exemplary embodiment. As such, the total color coat percent transmissivity described above is for a cured total color coat layer 54 having a color coat thickness of from about 4 to about 25 microns. In alternate embodiments, the total cured color coat thickness is from about 4 to about 20 or from about 8 to about 15 microns.

A substrate coating 52 includes the primer layer 24, the first color coat layer 32, and the second color coat layer 42, but does not include the e-coat layer 18 in this description. The substrate coating 52 provides a substrate coating percent transmissivity of: (1) about 0.02 or less at wavelengths of from 280 nm to 400 nm; (2) about 0.10 or less at wavelengths of from 400 nm to 430 nm; (3) about 0.25 or less at wavelengths of 430 nm to 470 nm; and (4) about 0.5 or less at wavelengths of 470 nm to 500 nm. As such, the primer layer 24 provides some of the desired percent transmissivity, but does not reduce the percent transmissivity enough to meet the desired protection for the e-coat layer 18. The total color coat layer 54 provides some of the desired percent transmissivity, but does not reduce the percent transmissivity enough to meet the desired protection for the e-coat layer 18. However, the substrate coating 52, which includes the primer layer 24 and the total color coat layer 54, does provide the desired reduction in percent transmissivity for protection of the e-coat layer 18. The substrate coating percent transmissivity, as detailed above, provides at least the minimal level of protection generally specified by many automobile manufacturers for the underlying e-coat layer 18.

In an exemplary embodiment, one or more clear coat layers (not illustrated) are applied over the total color coat layer 54, and the clear coat layer(s) are cured after the curing of the substrate coating 52. However, in alternate embodiments, the clear coat layer(s) are applied before curing the substrate coating 52, and the clear coat layer(s) are cured at the same time as the substrate coating 52.

The process described above is illustrated in the flow chart in FIG. 3. The process includes providing a substrate comprising a first portion that is plastic and a second portion that is metallic 60, and flame treating the first portion 62. The substrate is coated with a primer to form a primer layer 64 and the primer layer is flash dried 66. The primer layer is coated with a first color coat to form a first color coat layer 68, and the first color coat layer is coated with a second color coat to form a second color coat layer 70. The second color coat layer, the first color coat layer (collectively the total color coat layer), and the primer layer are cured to form a substrate coating 52.

This process allows for the rapid application of a coating over a substrate with a first portion that is primarily plastic and a second portion that is primarily metallic, where both portions are coated at the same time and in the same place. Alternatively, the same coating process may be used to coat plastic substrates individually, and to coat metallic substrates individually, using the same equipment and coatings. Therefore, no turn-around is required to switch the coating process for plastic versus metallic substrates. The coating process is rapid, with no curing between application of the primer layer 24 and the second color coat layer 42. Therefore, a single process can be used for substrates with different types of components, which reduces the support needed for an additional coating line.

EXAMPLES

The following coatings were produced.

Example Primer

| Material | Weight percent |
|---|---|
| Pigment (titanium dioxide, aluminum hydroxide, and magnesium silicate) | 21.8 |
| Conductivity additive (carbon black) | 1.6 |
| Resins (polypropylene glycol, acrylic polymer, acrylic resin, polyurethanes, and dispersants.) | 16.4 |
| Volatiles (2-amino-2-methyl-1-propanol, acetone, methyl ethyl ketone, isopropyl alcohol, ethylene glycol monobutyl ether, water, N,N-dimethyl ethanol amine, naphtha, triethylamine, and dipropylene glycol methyl ether.) | 58.9 |
| Other solids (mineral oil, (2,4,7,9-tetramethyl-5 decyne-4, diol), and petroleum distillates) | 1.3 |

Materials present at less than 0.1 percent are not listed. Weight percent are based on a total weight of the primer.

| Material | Weight percent |
|---|---|
| Pigment (carbon black, talc, and magnesium silicate) | 2.3 |
| Resins (2(2'-hydroxy-3,5'-diteramylphenyl benzotriazole), polypropylene glycol, acrylic polymer, and polyurethanes) | 25.6 |
| Volatiles (N-butyl alcohol, 2-amino-2-methyl-1-propanol, acetone, isopropyl alcohol, ethylene glycol monobutyl ether, water, N,N-dimethylethanol amine, naphtha, triethyl amine, and N-butoxypropanol.) | 70.9 |
| Other solids (mineral oil, (2,4,7,9-tetramethyl-5 decyne-4, diol), and petroleum distillates) | 1.2 |

Materials present at less than 0.1 percent are not listed. Weight percent are based on a total weight of the first color coat.

Example Color Coat, Black

Example Color Coat, Silver

| Material | Weight percent |
|---|---|
| Pigment (aluminum coated silicon dioxide, aluminum, talc, and magnesium silicate) | 5.4 |
| Resins (aliphatic/aromatic phosphate ester, polyurethanes, polypropylene glycol, acrylic polymer, polyacrylic resin thickener, and polyurethanes) | 17.9 |
| Volatiles (isobutyl alcohol, acetone, ethylene glycol monobutyl ether, water, naphtha, triethyl amine, and dimethylisopropanol amine.) | 75.6 |
| Other solids ((2,4,7,9-tetramethyl-5 decyne-4, diol), and petroleum distillates) | 1.1 |

Materials present at less than 0.1 percent are not listed. Weight percent are based on a total weight of the second color coat.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the application in any way. Rather, the foregoing detailed description will provide those skilled in the art with a convenient road map for implementing one or more embodiments, it being understood that various changes may be made in the function and arrangement of elements described in an exemplary embodiment without departing from the scope, as set forth in the appended claims.

What is claimed is:

1. A method of coating a substrate, the method comprising the steps of;

coating the substrate with a primer to form a primer layer, wherein the primer comprises a primer conductivity additive, a primer adhesion promotor additive, a primer binder, and primer volatiles;

flash drying the primer layer such that the primer volatiles are present in the primer layer at a concentration of about 20 weight percent or less, based on a total weight of the primer layer, wherein the primer binder is uncured;

coating the primer layer with a total color coat layer prior to curing the primer layer; and curing the total color coat layer and the primer layer to form a cured substrate coating having a substrate coating percent transmissivity of: (1) about 0.02 or less at wavelengths of from 280 nm to 400 nm; (2) about 0.10 or less at wavelengths of from 400 nm to 430 nm; (3) about 0.25 or less at wavelengths of 430 nm to 470 nm; and (4) about 0.5 or less at wavelengths of 470 nm to 500 nm, and wherein the primer layer, when cured, has a primer layer percent transmissivity of: (1) about 0.025 to about 0.05 at wavelengths of from 280 nm to 400 nm; (2) about 0.15 to about 0.5 at wavelengths of from 400 nm to 430 nm; (3) about 0.30 to about 1.0 at wavelengths of 430 nm to 470 nm; and (4) about 0.6 to about 2.0 at wavelengths of 470 nm to 500 nm;

wherein coating the substrate with the total color coat layer comprises:

coating the primer layer with a first color coat comprising a first activation additive to form a first color coat layer prior to curing the primer layer; and coating the first color coat layer with a second color coat that is free of isocyanate to form a second color coat layer prior to curing the first color coat layer, wherein the total color coat layer comprises the first color coat layer and the second color coat layer.

2. The method of claim 1, wherein the first activation additive comprises an isocyanate.

3. The method of claim 1, wherein:

the first color coat layer comprises a first binder, the second color coat layer comprises a second binder, and the first binder is the same as the second binder.

4. The method of claim 1, wherein:

coating the primer layer with the first color coat comprises coating the primer layer wherein the first color coat comprises a first solvent that is primarily water; and coating the first color coat layer with the second color coat comprises coating the first color coat layer wherein the second color coat comprises a second solvent that is primarily water.

5. The method of claim 1, wherein:

curing the total color coat layer and the primer layer comprises crosslinking the primer binder, a first binder, and a second binder.

6. The method of claim 1, wherein:

coating the substrate with the primer comprises coating the substrate wherein the substrate comprises a first portion that is primarily plastic, and where the substrate comprises a second portion that is primarily metallic.

7. The method of claim 6, wherein:

the second portion of the substrate comprises an e-coating.

8. The method of claim 6, further comprising:

flame treating the first portion of the substrate prior to coating the substrate with the primer.

9. The method of claim 1, wherein:

curing the total color coat layer and the primer layer comprises curing the primer layer such that the primer layer has a primer layer thickness of from about 3 to about 8 microns when cured.

10. The method of claim 1, wherein:

coating the substrate with the primer comprises coating the substrate with wherein the primer comprises a primer pigment, and wherein the primer has a primer pigment to primer binder ratio of 8 or greater, based on a total weight of the primer binder in the primer, and the total weight of the primer pigment in the primer.

11. The method of claim 1, wherein:

applying the primer comprises forming the primer layer having a surface conductivity of about $10^5$ ohms or greater at a distance of 4.45 millimeters from a central electrode to a plurality of perimeter probes around the central probe.

* * * * *